United States Patent [19]

Sadowsky

[11] Patent Number: 5,790,796
[45] Date of Patent: Aug. 4, 1998

[54] POLYMORPHIC PACKAGE FILES TO UPDATE SOFTWARE COMPONENTS

[75] Inventor: Richard Scott Sadowsky, San Jose, Calif.

[73] Assignee: Symantec Corporation, Cupertino, Calif.

[21] Appl. No.: 664,388

[22] Filed: Jun. 14, 1996

[51] Int. Cl.$^6$ .............................. G06F 9/44; G06F 17/30
[52] U.S. Cl. ........................... 395/200.51; 395/712
[58] Field of Search .......................... 395/712, 200.47, 395/200.48, 200.49, 200.51, 200.52, 200.5

[56] References Cited

U.S. PATENT DOCUMENTS

| | | | |
|---|---|---|---|
| 5,155,847 | 10/1992 | Kirouac et al. | 395/600 |
| 5,421,009 | 5/1995 | Platt | 395/600 |
| 5,473,772 | 12/1995 | Halliwell et al. | 395/712 |
| 5,493,682 | 2/1996 | Tyra et al. | 395/712 |
| 5,555,416 | 9/1996 | Owens et al. | 395/703 |

OTHER PUBLICATIONS

Watterson, Karen, "Win 95 scripts" Windows Sources, Apr. 1995 v3 n4 p. 161; n pag. CD. Computer Select Dec. 1995, Apr. 1995.

"Local Area Network Program Distribution Facility" *IBM Technical Disclosure Bulletin*, vol. 33, No. 5, Oct., 1990, pp. 169–171, XP000107424, United States of America.

"Use of Containers for Installing/Removing Products," *IBM Technical Disclosure Bulletin*, vol. 37, No. 2B, Feb., 1994, pp. 275–276 XP000433844, United States of America.

Business Wire Media Release, CyberMedia Inc., "Oil Change Software", May 14, 1996, Santa Monica, CA, U.S.A.

PRNewswire Media Release, CyberMedia Inc., "Product Briefing: CyberMedia Oil Change Software: How It Works", May 14, 1996, Santa Monica, CA, U.S.A.

PRNewswire Media Release, CyberMedia Inc., "Position Briefing: Oil Change Can Lower Both User And Vendor Tech Support Costs", May 14, 1996, Santa Monica, CA, U.S.A.

PRNewswire Media Release, CyberMedia Inc., "Software Updates: The Ongoing Problem of Timely Support", May 14, 1996, Santa Monica, CA, U.S.A.

*Primary Examiner*—Dinh C. Dung
*Attorney, Agent, or Firm*—Fenwick & West LLP

[57] ABSTRACT

A server computer (102) in a communication system (100) provides updated software programs to client computers (102) independent of the type of client (104) and the type of server (102). A polymorphic master object (300) has a predetermined structure known to all servers (102) and clients (104). Upon connection of the client (104) to the server (102), the server (102) provides the master object (300) to the client (104). The polymorphic master object (300) includes fields that indicate polymorphic package files that are available for transfer to the client (104). One such field is a distributed install file that includes, in a text format, instructions for instantiating the selected package file. Upon receipt, either the user or the client selects package file. The client (104) provides a request to the server (102) for the selected file, which the server (102) provides to the client (104). Using the distributed install file, the client (104) instantiates the selected package file.

37 Claims, 5 Drawing Sheets

POLYMORPHIC PACKAGE FILES TO UPDATE SOFTWARE COMPONENTS

FIELD OF THE INVENTION

The present invention pertains to updating software components of a client computer from a passive host server computer, and more particularly to updating software components using polymorphic package files.

BACKGROUND OF THE INVENTION

A user typically updates software executed by their client computer in several ways. First, the user may obtain new disks or CD-ROMs from a software vendor and load the new software from the disk into the client computer. Obtaining these disks is time consuming and frequently costs money. In addition, the customer may have difficulty in downloading the files from the disks. The user often learns about the update from technical support of the manufacturer while calling with a problem or a question. The support call costs the manufacturer even if the answer is standard or quick.

Second, the user may obtain the updated software by accessing a host computer at a remote site and downloading the associated files from the host. The host may be, for example, a bulletin board service (BBS), the Internet, an Internet provider, such as CompuServe, or other electronic forum. To download the software, the user configures his communication software to connect to the host, logs onto the host site, navigates to the appropriate file library, and initiates a transfer of the desired files. The user typically logs out of the host and completes the installation. The user's computer typically decompresses the transferred files. The user then follows installation instructions provided by the host. This process of updating software may be too complex for a novice user and may be difficult even for seasoned experts.

Certain software has a simplified updating process in which the user is provided with a software button that the user presses to initiate the update process. The software connects the user to a predetermined host and retrieves the update to that software. The software masks the user from the details of how and where the updated software is obtained. One such software package is Cyberjack produced by Delrina Group (part of Symantec) of Toronto, Ontario, Canada.

A software program may update itself automatically. The software program communicates with a host using transmission control protocol/Internet protocol (TCP/IP) services and checks for new versions of itself. If a new version exists, the software prompts the user to ask if the updated program should be retrieved. Such software is limited to retrieving updates of itself from a host operated by the software manufacturer. One such software package is PointCast Network beta manufactured by PointCast Inc.

It is desired to have a method for updating software that is not restricted to the type of software and that may be obtained from one of many sources. It is also desirable to have the method allow for updating software of a type that does not yet exist.

SUMMARY OF THE INVENTION

In the present invention, a method provides for retrieving a computer program from a remote server computer (102) to a client computer (104). A predetermined request signal is provided from the client (104) to the server (102). The server (102) provides a master object (300) to the client (104). The master object (300) includes a plurality of polymorphic descriptors of at least one computer program and also has a predetermined structure. The client (104) provides one of the polymorphic descriptors to the server (102) in response to a selection. The server (102) provides the computer program corresponding to the provided polymorphic descriptor to the client (104).

Another of the polymorphic descriptors includes instructions for the client (104) to instantiate the provided computer program and has a predetermined format independent of a type of the client (104). This polymorphic descriptor is parsed to determine the instructions, which the client (104) executes for instantiating the provided computer program. This polymorphic descriptor may be a text field.

A communication system (100) includes a server memory (106), a server (102), and a client (104). The server memory (106) stores a master object (300) and a plurality of computer programs. The master object (300) includes a plurality of polymorphic descriptors of the plurality of computer programs and has a predetermined structure.

The server (102) retrieves the master object (300) from the server memory (106) and provides the master object (300) to the client (104) in response to a predetermined request signal from the client (104). The client (104) provides a program request indicative of one of the polymorphic descriptors to the server (102) in response to a selection. In response to the program request, the server (102) provides the computer program corresponding to the indicated polymorphic descriptor.

The communication system (100) further includes a client memory (108). Another of the polymorphic descriptors includes instructions for instantiating the provided computer program into the client memory (108). This polymorphic descriptor has a predetermined format independent of a type of the client (104). The client (104) parses this polymorphic descriptor to determine the instructions and executes the instructions to instantiate the provided computer program into the client memory (108). The polymorphic descriptor may be a text field.

A method provides a computer program from a remote server (102) to a client (104). The server (102) provides a master object (300) to the client (104) in response to a predetermined request signal. The master object (300) includes a plurality of polymorphic descriptors of at least one computer program and has a predetermined structure. The server (102) provides a computer program corresponding to a selected polymorphic descriptor indicative of the computer program in response to a program request indicative of the selected polymorphic descriptor from the client (104). One of the polymorphic descriptors includes instructions to the client (104) for instantiating the provided computer program and has a predetermined format independent of a type of the client (104).

A host includes a server memory (106) and a server (102). The server memory (106) stores a plurality of computer programs and a master object (300) that includes a plurality of polymorphic descriptors of the plurality of computer programs and has a predetermined structure. A server (102) retrieves the master object (300) from the server memory (106) and provides the master object (300) to the client (104) in response to a predetermined request signal and provides the computer program corresponding to one of the polymorphic descriptors in response to a program request indicative of the selected one of the polymorphic descriptors. Another of the polymorphic descriptors includes instructions for instantiating the provided computer program by a client (104) and has a predetermined format independent of a type of the client (104). This polymorphic descriptor may be a text field.

In a method, a computer program is retrieved from a remote server (102) by a client (104). The client (104) provides a predetermined request signal to the server (102). The client (104) receives a master object (300) from the server (102). The master object (300) includes a plurality of polymorphic descriptors of at least one computer program and has a predetermined structure. The client (104) provides a program request indicative of one of the polymorphic descriptors to the server (102) in response to a selection and receives the computer program corresponding to the indicated polymorphic descriptor from the server (102). Another of the polymorphic descriptors includes instructions for the client (104) to instantiate the received computer program and has a predetermined format independent of a type of the client (104). The client (104) parses this polymorphic descriptor to determine said instructions and executes the instructions to instantiate the received computer program. This polymorphic descriptor may be text field.

An apparatus retrieves a computer program and a master object (300) from a remote server (102). The master object (300) includes a plurality of polymorphic descriptors of the plurality of computer programs and has a predetermined structure. The apparatus includes a client (104) and a client memory (108). The client memory (108) stores the master object (300) and a program (208) executable by the client (104). The program (208) generates a predetermined request signal to send to the remote server (102) to request the master object (300). The program (208) instantiates into the client memory (108) the master object (300) received from the server (102). The program (208) provides a program request indicative of one of the polymorphic descriptors to the server (102) in response to a selection signal. The program (208) executes a computer program corresponding to said indicated one of the polymorphic descriptors received from the server (102).

The program determines instructions for instantiating the computer program from another of the polymorphic descriptors. This polymorphic descriptor has a predetermined format independent of a type of the client (104). The program (208) parses this polymorphic descriptor to determine said instructions and executes said instructions for instantiating the provided computer program into the client memory (108). This polymorphic descriptor may be a text field.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
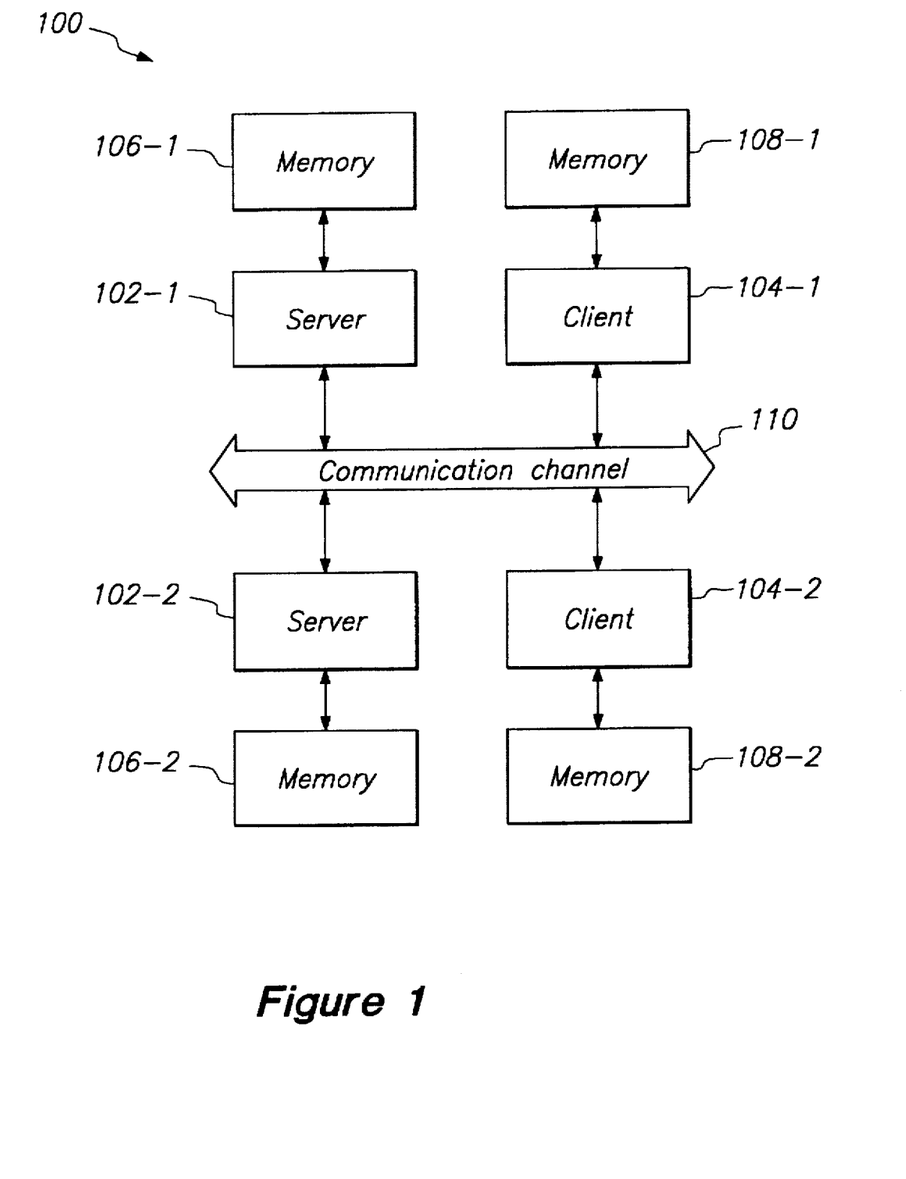
FIG. 1 is a block diagram illustrating a communication system 100 in accordance with the present invention.

Referring to FIG. 1, there is shown a block diagram illustrating a communication system 100 in accordance with the present invention. The communication system 100 includes a plurality of server computers 102-1 and 102-2, a plurality of client computers 104-1 and 104-2, a plurality of server memories 106-1 and 106-2, a plurality of client memories 108-1 and 108-2, and a communication channel 110. For clarity, only two servers 102, two clients 104, two memories 106, and two memories 108 are shown. The servers 102 and the clients 104 are each coupled to the communication channel 110. The server memories 106-1 and 106-2 are coupled to respective servers 102-1 and 102-2. The client memories 108-1 and 108-2 are coupled to respective clients 104-1 and 104-2. The servers 102-1 and 102-2 need not be identical to each other. Likewise, the clients 104-1 and 104-2 need not be identical to each other. As will be described later herein, a polymorphic master object 200 (see FIG. 2) has a structure known to the servers 102 and to the clients 104. Polymorphism provides a predetermined structure but the actual implementation of the object is deferred until run time. By communicating the polymorphic master object 200, the servers 102 may provide software to the clients 104 without the servers 102 and the clients 104 containing information about the structure of each other. One such use of the polymorphic master object 200 is for updating software executed by a client 104. The polymorphic master object 200 allows the client 104 to communicate with any of the servers 102 without having knowledge of the actual implementation of software package files in the server. The client 104 uses the master object 200 to learn of the available package files, to communicate a selection to the server 102, and to execute the selected package file after receipt.

To update software, the server 102 operates as a passive host server. The server 102 may be, for example, a Compuserve (TM) host, a conventional Web page, or a Novell file server. The servers 102 and the clients 104 each may be, for example, a computer that includes a Pentium (TM) processor manufactured by Intel Corporation of Santa Clara, Calif., and that executes Windows 95 operating system manufactured by Microsoft Corporation of Redmond, Wash. As noted above, the servers 102 and the clients 104 are not necessarily identical. The server 102 may be, for example, a SPARC20-based computer executing UNIX operating system, and the client 104 may be the Pentium (TM) based computer noted above.

The communication channel 110 may be, for example, an Internet. The servers 102 and the clients 104 each execute programs stored in the server memory 106 and the client memory 108, respectively, as described later herein.

For clarity and simplicity, the operation of the communication system 100 is described for a single server 102 and a single client 104. Of course communication may be between multiple servers 102 and clients 104.

Figure 2:
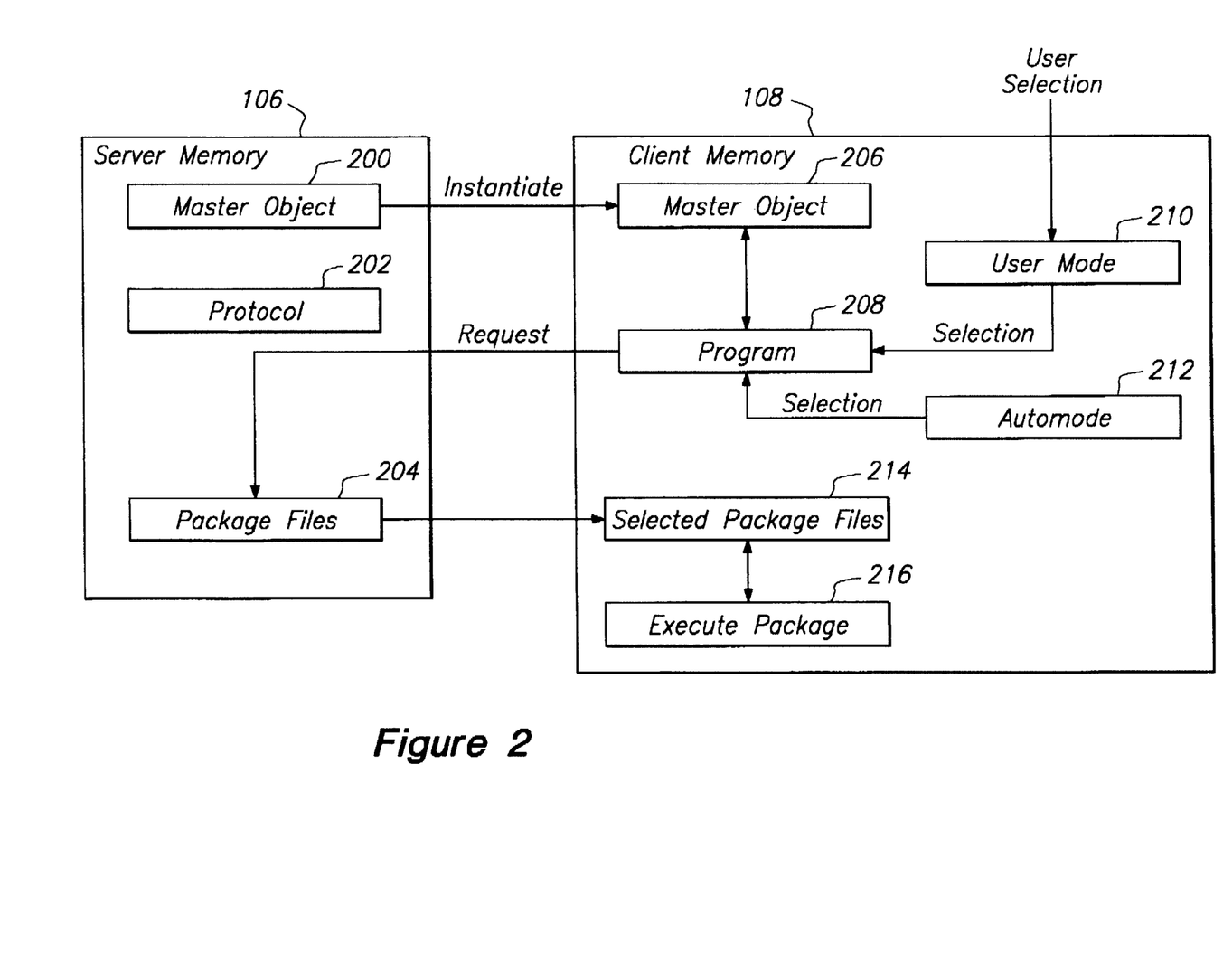
FIG. 2 is an illustration of the server memory 106 and the client memory 108 of the communication system 100 of FIG. 1.

Referring to FIG. 2, there is shown an illustration of the server memory 106 and the client memory 108 of the communication system 100. The server memory 106 and the client memory 108 are computer-readable storage media, such as a disks or program memory. The server memory 106 includes a master object 200, a protocol file 202, and a plurality of software package files 204.

The master object 200 is a persistent object that is a data representation of objects. In particular, the master object 200 includes a list of software package files 204 that are available for execution by the client 104. The master object 200 allows the client 104 to learn about new types of software packages and action items that are stored in the server 102 and that conform to a defined application program interface (API) involving virtual functions. The master object 200 includes a plurality of fields, which are described later in conjunction with FIG. 3. Some of these fields are polymorphic. The structure of the master object 200 is independent of the type of client 104 and server 102, such as the processor or operating system. The structure of the master object 200 also is independent of the type of package file 204. This allows the master object 200 to convey information to the client about the software or data that is available for updating independent of the type of software or data. As future yet unknown software programs are developed, the master object 200 may represent such software and provide sufficient information to the client 104 to load or update such software from the server 102 to the client 104.

The protocol file 202 includes the protocol information for communicating on the communication channel 110. The protocol file 202 preferably includes the protocol information of a plurality of protocols.

The plurality of package files 204 are the software files that are retrievable by the client 104. The package files 204 may be polymorphic. Using such protocol information, the server 102 may communicate over communication channels 110 of various protocols. The master object 200 includes the information about these package files 204 to allow the client 104 or a user to select a package file 204 for retrieval and to allow the client 104 to instantiate a selected package file 204.

The client memory 108 includes a master object 206, a program 208, a user mode program 210, an auto mode program 212, selected package files 214, and an execute package program 216. The master object 206 is the master object 200 from the server memory 106 that is instantiated into the client memory 108. The program 208 allows the user to select a program from a screen (not shown) by pushing a virtual button thereon and to retrieve the selected program from the server 102, or automatically selects the program for retrieval. In particular, the user mode program 210 is a program that allows a user to select package files 204 from the master object 206, during a user mode. The program 208 retrieves the selected package files 204 from the server memory 106. The auto mode program 212 automatically selects package files 204 from the master object 206 in accordance with a predetermined selection criterion, such as the age of the package file 204, during an automatic mode. The program 208 sends a program request indicative of the selected file to the server 102, which provides the selected package file 204 to the client 104. The format of the program request is predetermined. Both the client 104 and the server 102 know the format of the program request.

The selected package file 214 stores the package files 204 retrieved from the server 102 in response to either user selections in the user mode or client selections in the auto mode. The execute package program 216 executes or installs the selected package. Some selected packages are not installed onto disk for later use. Such programs are executed during the current client use and not saved after shut down of the client 104.

Figure 3:
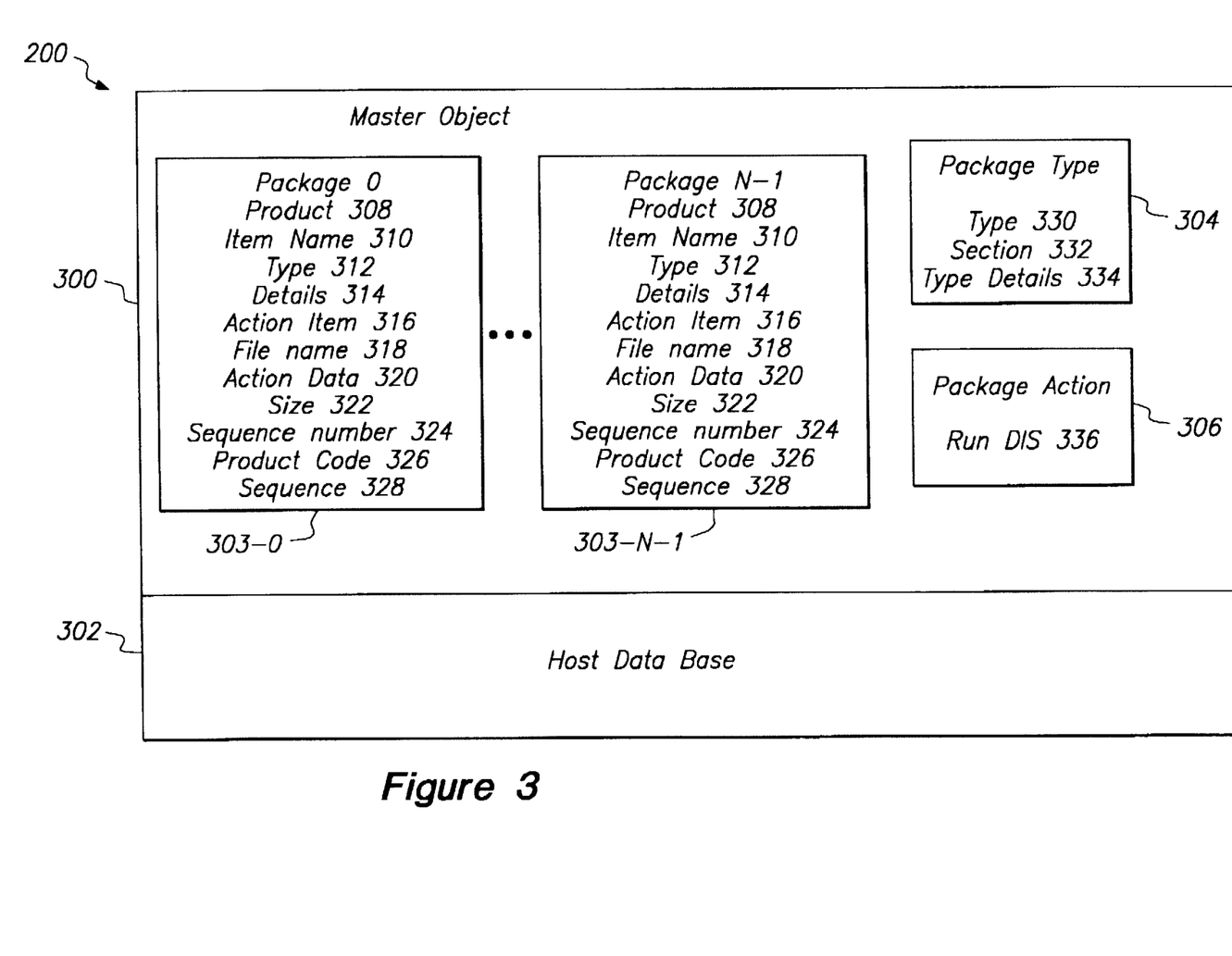
FIG. 3 is an illustration of a master object 200 of the server memory 106 in the communication system 100 of FIG. 1.

Referring to FIG. 3, there is shown an illustration of a master object 200 of a server 102 in the communication system 100. The master object 200 includes a master object 300 and a host data base 302. The master object 300 includes object descriptions of the package files 204 of available software, object descriptions of the type of package files, and object descriptions of the type of action items.

The host data base 302 includes a list of hosts that can be called. The list includes the name of each host, the type of host, and the connection string, such as a phone number or address. The files listed in the host data base 302 are files that are changed infrequently relative to the files listed by the master object 300. Of course, the host data base 302 may be deleted from the master object 200 and the files listed in the host data base 302 included in the master object 300.

The master object 300 includes a plurality of package files 303-0 through 303-N-1, a package type object 304, and a package action object 306. For clarity, only two package files 303 are shown. The master object 300 may be a text file. After reading the master object 300, the client 104 parses the master object 300 and builds the master object 306 in the client memory 108.

Each package file 303 includes a product name field 308, an item name field 310, a type field 312, a details field 314, an action item field 316, a file name field 318, an action data field 320, a size field 322, a sequence number field 324, a product code field 326, and a sequence field 328.

The product name field 308 indicates the group product name of the file, which is the name of a group of programs. The product name may be, for example, NORTON Antivirus. The item name field 310 is the name of a specific software package file 204. The file 204 is the file that the program 208 requests for use by the client 104. The item name field 310 indicates the name that is displayed to the user in the user mode for the user selection.

The type field 312 indicates the type of file, such as software, data, update or the like. The type field 312 includes text and is used for matching the file with other like files. The details field 314 includes text that provides further information regarding the file. The text is displayed in the user mode if requested by the user. The action item field 316 points to the action item that is to occur, which is the execution of a distributed install script (DIS) file. The action item field 316 may be a text file. The DIS file includes information usable by the program 208 to instantiate the package file 304 received from the server 102. The action item is a set of instructions that the program 208 executes. Each action item of the action item field 316 is defined in the package action object 306 as described below.

The file name field 318 indicates the name of the file in the server memory 106 that is to be downloaded to the client 104. The action data field 320 is a spare user defined field that allows flexibility for future currently unknown software packages. The size field 322 indicates the size of the package. The program 208 uses this number to estimate the time for downloading the package. The sequence number field 324 is a unique number for the software package that distinguishes it from other versions of the software. The sequence number may be, for example, the date of the update to the software program. Alternatively, a version number may be used instead of the sequence number.

The product code field 326 includes special flags for specific software products. The product code field 326 is part of the polymorphism of the master object 300. The product code field 326 is a spare field that provides flexibility for future currently unknown software packages. The sequence field 328 is a place holder object for encapsulation. An example of an encapsulation function is a compare function.

The master object 300 also may include a field indicating the language of the program, such as English.

The master object 300 includes a package type field 304 for each type of file in the master object 300 as indicated by the type field 312 of the package file 303. For clarity, only one package type field 304 is shown. The package type field 304 includes a type field 330, a section field 332, and a type details field 334. The type field 330 indicates the name of the file. The type fields 330 correspond to the type fields 312 in the package file 303. The section field 332 indicates the section of the file. The type details field 334 includes details about the file type for the user mode 210 to display to the user.

The master object 300 includes a package action object 306 for each action item of the action item field 316. For clarity, only one package action object 306 is shown. The package action 306 includes a run distributed install script (DIS) field 336 that causes the program 208 to launch the instantiation of the selected package file 214. The run DIS field 336 is polymorphic. An example of a run DIS field 336 may include an associated script name and an associated directory in the package file 214. The action items may be, for example, parse, execute command, or return results.

Figure 4:
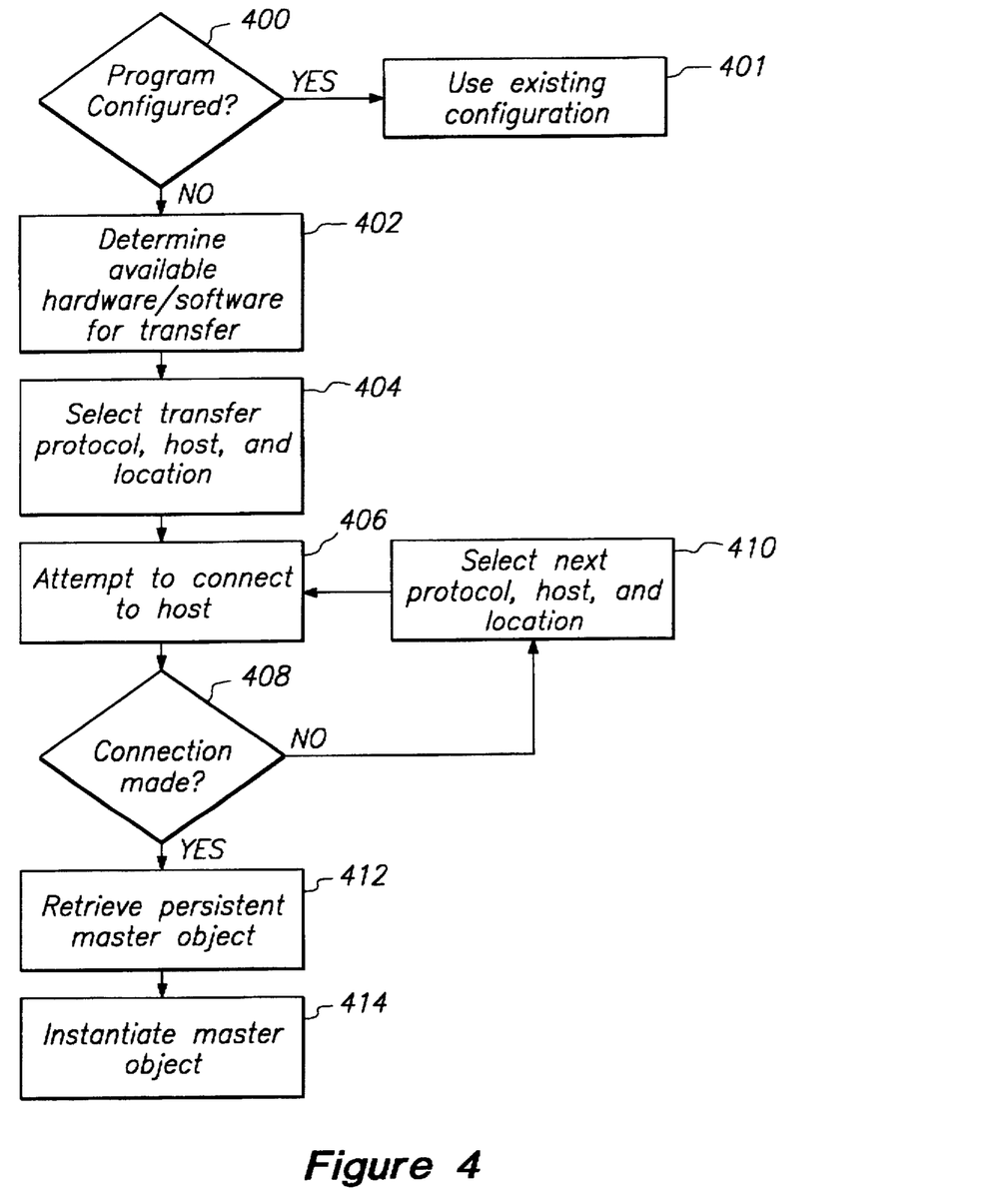
FIG. 4 is a flowchart illustrating the operation of retrieving the master object 200 from the server memory 106.

Referring to FIG. 4, there is shown a flowchart illustrating the operation of the client 104 retrieving the master object 200 from the server memory 106. If the program 208 is configured 400, the program 208 uses 401 the existing configuration. If the program 208 is not configured 400, the program 208 determines 402 the available servers 102, the available communication channels 110, and the available software for communicating over the channel 110 for the transfer. The available software is the software stored in the client 104, such as operating system and protocol, that is used for communicating over the channel 110. The program 208 selects 404 the transfer protocol, host, and location from those that are available by comparing the available protocols with a priority list of protocols and selecting the available protocol with the highest priority. The priority list may be, for example, first select TCP/IP communication first and second select modem communication. Alternatively, the selection may be in accordance with a set of rules that evaluate the traffic on the channel, the data transfer rate, and the like. The program 208 attempts to connect 406 to the host or server 102. If 408 a connection is not made, the program 208 selects 410 the next protocol, host, and location and again tries to connect 406.

On the other hand, if 408 a connection is made, the program 208 retrieves 412 the master object 200 from the server 102 by sending a predetermined request signal to the server 102. The format of the request signal is predetermined. Both the client 104 and the server 102 know the format of the this request. The program 208 instantiates 414 the master object 200 into the master object 206 by executing the instantiation routine described in conjunction with FIG. 5.

Figure 5:
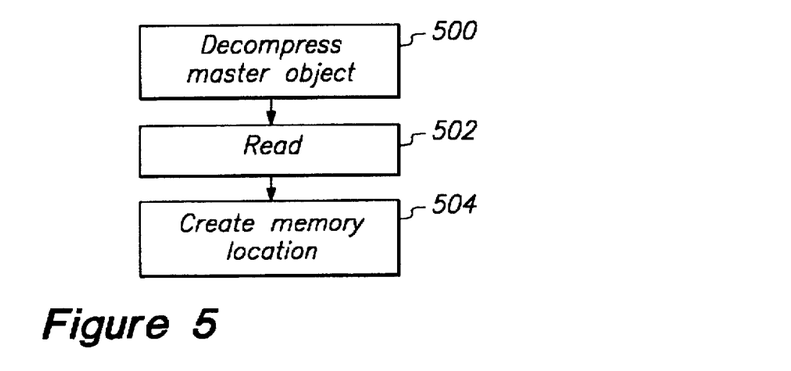
FIG. 5 is a flowchart illustrating the instantiation of the master object 200.

Referring to FIG. 5, there is shown a flowchart illustrating the instantiation of the master object 200 by the client 104. The program 208 decompresses 500 the master object 200 if it is compressed. The program 208 reads 502 the master object 200. The program 208 creates 504 a memory location for storing the master object as the master object 206.

Figure 6:
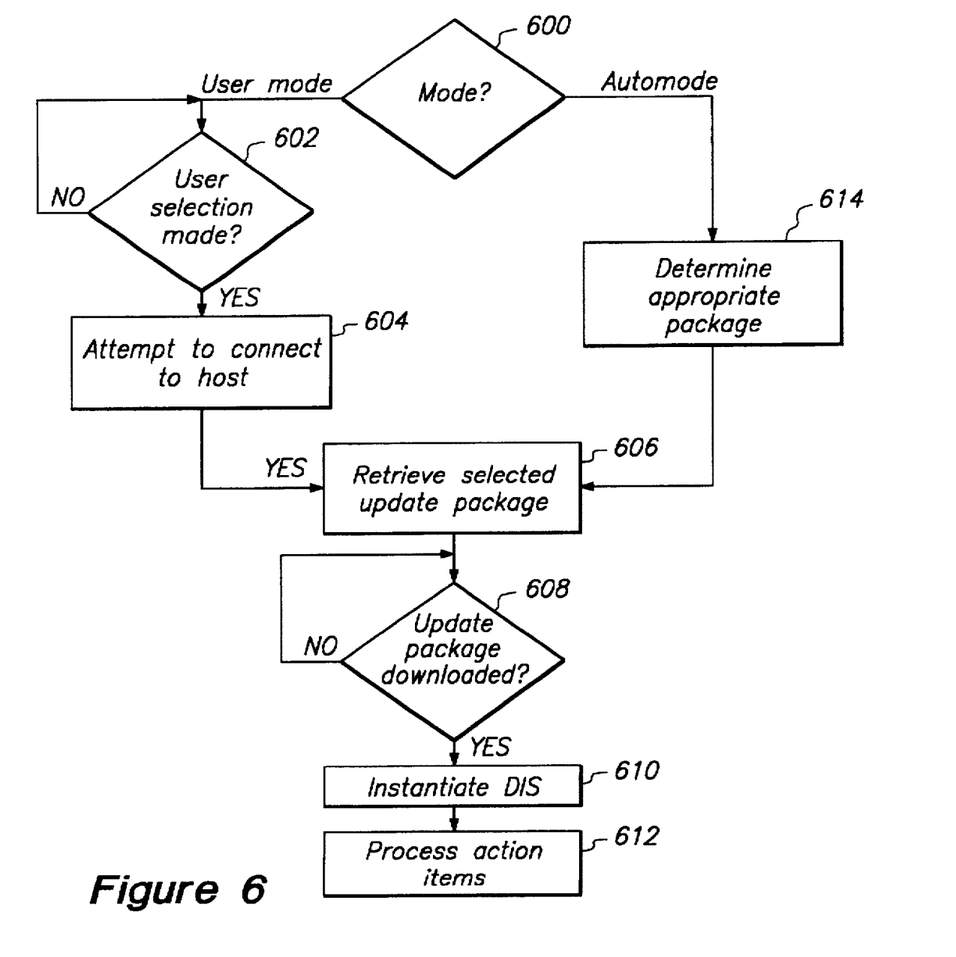
FIG. 6 is a flowchart illustrating the retrieving and instantiating of selected package files 204 from the server memory 106.

Referring to FIG. 6, there is shown a flowchart illustrating the retrieving and instantiating of package files 204 selected from the server 102. The client 104 may operate in one of two modes. In an automatic (auto) mode, the automode program 212 reads the master object 206 and determines the package files 204 to select. In a user mode, the user mode program 210 displays the package files 204 that may be selected and the user selects the package file 204 to retrieve from the server 102.

If 600 the client 104 is in the user mode, the user mode program 210 waits 602 for a user selection. When a user selection is made, the program 208 tries to connect 604 to the server 102. When a connection is made to the server 102, the program 208 retrieves 606 the selected update package 204 from the server 102 by sending a program request indicative of the selected program. The program request may be a polymorphic descriptor parsed from the master object 200. When the update package 204 is downloaded 608, the execute package program 216 instantiates 610 the action item field 316 and processes 612 the action items therein. For an action item field 316 that is a text field, the execute package program 216 parses the text field to generate the commands to be executed. The execute package program 216 can now execute the action items. Using the polymorphic master object 200, the execute package program 216 need not know the action items until the file 204 is downloaded. This allows the file 204 in the server 102 to be constantly updated until the file 204 is retrieved by a client 104.

On the other hand, if the client 104 is in auto mode, the auto mode program 212 determines 614 the appropriate package 204. Such determination may be made by selecting predetermined package types using the type field 312 and updating any package 204 having a sequence number in the sequence number field 324 that is greater than the sequence number in the file in the client memory 108. The program 208 retrieves 606 the selected update package 204 as described above.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for retrieving a computer program from a remote server computer to a client computer, the method comprising the steps of:

providing a predetermined request signal from the client to the server;

providing a polymorphic master object from the server to the client, the polymorphic master object including a plurality of polymorphic descriptors of at least one computer program, the polymorphic master object having a predetermined structure that is independent of the type of said client;

providing one of the polymorphic descriptors from the client to the remote server in response to a selection; and providing the computer program corresponding to the provided polymorphic descriptor from the server to the client.

2. The method of claim 1 wherein another of the polymorphic descriptors includes instructions for instantiating the provided computer program by the client.

3. The method of claim 2 wherein said another of the polymorphic descriptors has a predetermined format independent of a type of the client.

4. The method of claim 2 further comprising the steps of parsing said another of the polymorphic descriptors to determine said instructions and executing said instructions for instantiating the provided computer program.

5. The method of claim 1 wherein the polymorphic descriptor is a field containing instructions for instantiating the selected computer program.

6. The method of claim 5 wherein said field is a text field.

7. A communication system comprising:
- a server memory for storing a polymorphic master object and for storing a plurality of computer programs, the polymorphic master object including a plurality of polymorphic descriptors of the plurality of computer programs and having a predetermined structure that is independent of the type of the client;
- a server coupled to the server memory for retrieving the polymorphic master object from the server memory and having an output for providing the polymorphic master object in response to a predetermined request signal and for providing the computer program corresponding to one of the polymorphic descriptors in response to a program request indicative of said one of the polymorphic descriptors; and
- a client coupled to the output of the server, and being coupled to the server for providing the predetermined request signal and for providing said program request indicative of one of the polymorphic descriptors in response to a selection.

8. The communication system of claim 7 further comprising a client memory coupled to the client and wherein another of the polymorphic descriptors includes instructions for instantiating the provided computer program into the client memory.

9. The communication system of claim 8 wherein said another of the polymorphic descriptors has a predetermined format independent of a type of the client.

10. The communication system of claim 8 wherein the client parses said another of the polymorphic descriptors to determine said instructions and executes said instructions for instantiating the provided computer program into the client memory.

11. The communication system of claim 7 wherein the polymorphic descriptor is a field containing instructions for instantiating the selected computer program.

12. The communication system of claim 11 wherein said field is a text field.

13. A method for providing a computer program from a remote server computer to a client computer, the method comprising the steps of:
- receiving a predetermined request signal from the client;
- providing a polymorphic master object to the client, the polymorphic master object including a plurality of polymorphic descriptors of at least one computer program, the polymorphic master object having a predetermined structure that is independent of the type of the client;
- receiving a program request indicative of one of the polymorphic descriptors from the client indicative of a selected computer program; and
- providing the computer program corresponding to the indicated polymorphic descriptor in the program request to the client.

14. The method of claim 13 wherein another of the polymorphic descriptors includes instructions to the client for instantiating the provided computer program.

15. The method of claim 14 wherein said another of the polymorphic descriptors has a predetermined format independent of a type of the client.

16. The method of claim 13 wherein the polymorphic descriptor is a field containing instructions for instantiating the selected computer program.

17. The method of claim 16 wherein said field is a text field.

18. A host computer comprising:
- a server memory for storing a polymorphic master object and for storing a plurality of computer programs, the polymorphic master object including a plurality of polymorphic descriptors of the plurality of computer programs and having a predetermined structure that is independent of the type of the client; and
- a server computer coupled to the server memory for retrieving the polymorphic master object from the server memory and having an output for providing the polymorphic master object in response to a predetermined request signal and for providing a computer program corresponding to one of the polymorphic descriptors in response to a program request indicative of said one of the polymorphic descriptors.

19. The host of claim 18 wherein another of the polymorphic descriptors includes instructions for instantiating the provided computer program by a client computer.

20. The host of claim 19 wherein said another of the polymorphic descriptors has a predetermined format independent of a type of the client.

21. The host of claim 18 wherein the polymorphic descriptor is a field containing instructions for instantiating the selected computer program.

22. The host of claim 21 wherein said field is a text field.

23. A method for retrieving a computer program from a remote server computer by a client computer, the method comprising the steps of:
- providing a predetermined request signal to the server;
- receiving a polymorphic master object from the server, the polymorphic master object including a plurality of polymorphic descriptors of at least one computer program, the polymorphic master object having a predetermined structure that is independent of the type of the client;
- providing a program request indicative of one of the polymorphic descriptors to the server in response to a selection; and
- receiving the computer program corresponding to the indicated polymorphic descriptor in the program request from the server.

24. The method of claim 23 wherein another of the polymorphic descriptors includes instructions for instantiating the provided computer program by the client.

25. The method of claim 24 wherein said another of the polymorphic descriptors has a predetermined format independent of a type of the client.

26. The method of claim 24 further comprising the steps of parsing said another of the polymorphic descriptors to determine said instructions and executing said instructions for instantiating the provided computer program.

27. The method of claim 23 wherein the polymorphic descriptor is a field containing instructions for instantiating the selected computer program.

28. The method of claim 27 wherein said field is a text field.

29. An apparatus for retrieving a computer program and a polymorphic master object from a remote server computer, the polymorphic master object including a plurality of polymorphic descriptors of the plurality of computer programs and having a predetermined structure, the apparatus comprising:
- a client computer;
- a client memory for storing the polymorphic master object and for storing a program executable by the client computer, the program generating a predetermined request signed in response to a selection signal, instantiating into the client memory the polymorphic master object received from the server in response to the predetermined request signal, providing a program request indicative of one of the polymorphic descriptors to the server, and executing a computer program corresponding to said indicated one of the polymorphic descriptors.

30. The apparatus of claim 29 further comprising a client memory coupled to the client computer and wherein another of the polymorphic descriptors includes instructions for instantiating the provided computer program into the client memory.

31. The apparatus of claim 30 wherein said another of the polymorphic descriptors has a predetermined format independent of a type of the client computer.

32. The apparatus of claim 30 wherein the client computer parses said another of the polymorphic descriptors to determine said instructions and executes said instructions for instantiating the provided computer program into the client memory.

33. The apparatus of claim 29 wherein the polymorphic descriptor is a field containing instructions for instantiating the selected computer program.

34. The apparatus of claim 32 wherein said field is a text field.

35. A computer-readable medium having stored thereon instructions which, when executed by a processor, cause the processor to perform the steps of:

provlding a predetermined request signal from a client to a server;

providing a polymorphic master object from the server to the client, the polymorphic master object including a plurality of polymorphic descriptors of at least one computer program, the polymorphic master object having a predetermined structure that is independent of the type of the client;

providing one of the polymorphic descriptors from the client to the remote server in response to a selection; and providing the computer program corresponding to the provided polymorphic descriptor from the server to the client.

36. A computer-readable medium having stored thereon instructions which, when executed by a processor, cause the processor to perform the steps of:

receiving a predetermined request signal from a client;

providing a polymorphic master object to the client, the master object including a plurality of polymorphic descriptors of at least one computer program, the polymorphic master object having a predetermined structure that is independent of the type of the client;

receiving a program request indicative of one of the polymorphic descriptors from the client indicative of a selected computer program; and providing the computer program corresponding to the indicated polymorphic descriptor in the program request to the client.

37. A computer-readable medium having stored thereon instructions which, when executed by a processor, cause the processor to perform the steps of:

providing a predetermined request signal to a server;

receiving a polymorphic master object from the server the polymorphic master object including a plurality of polymorphic descriptors of at least one computer program, the master object having a predetermined structure that is independent of the type of the client;

providing a program request indicative of one of the polymorphic descriptors to the server in response to a selection; and receiving the computer program corresponding to the indicated polymorphic descriptor in the program request from the server.

* * * * *